US008285792B2

(12) United States Patent
Itoh (10) Patent No.: US 8,285,792 B2
(45) Date of Patent: Oct. 9, 2012

(54) SERVER, METHOD, AND PROGRAM FOR PROVIDING FINANCIAL INFORMATION

(75) Inventor: Hiroki Itoh, Tokyo (JP)

(73) Assignee: Estijl Co. Ltd., Tokyo (JP)

( * ) Notice: Subject to any disclaimer, the term of this patent is extended or adjusted under 35 U.S.C. 154(b) by 0 days.

(21) Appl. No.: 13/177,278

(22) Filed: Jul. 6, 2011

(65) Prior Publication Data

US 2012/0011203 A1  Jan. 12, 2012

(30) Foreign Application Priority Data

Jul. 9, 2010 (JP) .................................. 2010-156697

(51) Int. Cl.
*G06F 15/16* (2006.01)
(52) U.S. Cl. ...................................................... 709/205
(58) Field of Classification Search .................. 709/205, 709/217
See application file for complete search history.

(56) References Cited

U.S. PATENT DOCUMENTS

| | | | |
|---|---|---|---|
| 6,298,455 B1 | 10/2001 | Knapman et al. | |
| 7,246,742 B2 | 7/2007 | Minaguchi et al. | |
| 7,421,153 B1 * | 9/2008 | Ronca et al. | 382/305 |
| 7,856,397 B2 * | 12/2010 | Whipple et al. | 705/38 |
| 2009/0063360 A1 | 3/2009 | Callaway et al. | |

FOREIGN PATENT DOCUMENTS

| | | |
|---|---|---|
| JP | A-2006-031371 | 2/2006 |
| JP | A-2007-274332 | 10/2007 |
| JP | A-2008-147819 | 6/2008 |
| WO | WO 2009/098436 A1 | 8/2009 |

OTHER PUBLICATIONS

Oct. 19, 2011 Search Report issued in European Patent Application No. 11173061.0.

* cited by examiner

*Primary Examiner* — Jason Recek
(74) *Attorney, Agent, or Firm* — Oliff & Berridge, PLC (57) ABSTRACT

A financial information providing system 1 includes a synchronous distribution node 10, asynchronous distribution node 20, and data providing system 30, client terminal 40. The synchronous distribution node 10 and asynchronous distribution node 20 distribute messages including financial information. The data providing system 30 edits the messages distributed by the synchronous distribution node 10 and asynchronous distribution node 20 and transmits an edited message to the client terminal 40. Each server 31 of the data providing system 30 adds a group number and sequence number to a message distributed by the synchronous distribution node 10 and adds a sequence number to a message distributed by the asynchronous distribution node 20.

7 Claims, 8 Drawing Sheets

| add seq2 | add seq1 | seq | COMPANY NAME | PRICE | VOLUME |
|---|---|---|---|---|---|
| 10 | 10 | 10 | G COMPANY | 249 | 7000 |
| 9 | 9 | 9 | B COMPANY | 50 | 324000 |
| 8 | 8 | 8 | F COMPANY | 125800 | 600 |
| 7 | 7 | 7 | E COMPANY | 4589 | 1125000 |
| 6 | 6 | 6 | D COMPANY | 3785 | 5000 |
| 5 | 5 | 5 | C COMPANY | 1249 | 100000 |
| 4 | 4 | 4 | C COMPANY | 1253 | 23000 |
| 3 | 3 | 3 | C COMPANY | 1251 | 5000 |
| 2 | 2 | 2 | B COMPANY | 51 | 356000 |
| 1 | 1 | 1 | A COMPANY | 712 | 105000 |

ENTITY 11

| seq | COMPANY NAME | PRICE | VOLUME |
|---|---|---|---|
| 10 | H COMPANY | 3760 | 500 |
| 9 | C COMPANY | 60 | 40000 |
| 8 | G COMPANY | 786 | 11000 |
| 7 | F COMPANY | 981 | 2000 |
| 6 | E COMPANY | 56000 | 300 |
| 5 | A COMPANY | 1270 | 200 |
| 4 | D COMPANY | 3560 | 125000 |
| 3 | C COMPANY | 59 | 20000 |
| 2 | B COMPANY | 500 | 100000 |
| 1 | A COMPANY | 1250 | 100 |

ENTITY 12

| seq | COMPANY NAME | PRICE | VOLUME |
|---|---|---|---|
| 10 | H COMPANY | 3760 | 500 |
| 9 | C COMPANY | 60 | 40000 |
| 8 | G COMPANY | 786 | 11000 |
| 7 | F COMPANY | 981 | 2000 |
| 6 | E COMPANY | 56000 | 300 |
| 5 | A COMPANY | 1270 | 200 |
| 4 | D COMPANY | 3560 | 125000 |
| 3 | C COMPANY | 59 | 20000 |
| 2 | B COMPANY | 500 | 100000 |
| 1 | A COMPANY | 1250 | 100 |

FIG. 6

ENTITY 21

| seq | COMPANY NAME | PRICE | VOLUME |
|---|---|---|---|
| 10 | GG COMPANY | 249 | 7000 |
| 9 | BB COMPANY | 50 | 324000 |
| 8 | FF COMPANY | 125800 | 600 |
| 7 | EE COMPANY | 4589 | 1125000 |
| 6 | DD COMPANY | 3785 | 5000 |
| 5 | CC COMPANY | 1249 | 100000 |
| 4 | CC COMPANY | 1253 | 23000 |
| 3 | CC COMPANY | 1251 | 5000 |
| 2 | BB COMPANY | 51 | 356000 |
| 1 | AA COMPANY | 712 | 105000 |

ENTITY 22

| seq | COMPANY NAME | PRICE | VOLUME |
|---|---|---|---|
| 10 | II COMPANY | 7512 | 5000 |
| 9 | HH COMPANY | 220 | 82000 |
| 8 | GG COMPANY | 249 | 7000 |
| 7 | BB COMPANY | 50 | 324000 |
| 6 | FF COMPANY | 125800 | 600 |
| 5 | EE COMPANY | 4589 | 1125000 |
| 4 | DD COMPANY | 3785 | 5000 |
| 3 | CC COMPANY | 1249 | 100000 |
| 2 | CC COMPANY | 1253 | 23000 |
| 1 | CC COMPANY | 1251 | 5000 |

| add seq1 | seq | COMPANY NAME | PRICE | VOLUME |
|---|---|---|---|---|
| 10 | 10 | G COMPANY | 249 | 7000 |
| 9 | 9 | B COMPANY | 50 | 324000 |
| 8 | 8 | F COMPANY | 125800 | 600 |
| 7 | 7 | E COMPANY | 4589 | 1125000 |
| 6 | 6 | D COMPANY | 3785 | 5000 |
| 5 | 5 | C COMPANY | 1249 | 100000 |
| 4 | 4 | C COMPANY | 1253 | 23000 |
| 3 | 3 | C COMPANY | 1251 | 5000 |
| 2 | 2 | B COMPANY | 51 | 356000 |
| 1 | 1 | A COMPANY | 712 | 105000 |

FIG. 12

| GrID2 | add seq2 | GrID1 | add seq1 | seq | COMPANY NAME | PRICE | VOLUME |
|---|---|---|---|---|---|---|---|
| 1 | 16 | 1 | 10 | 10 | H COMPANY | 3760 | 500 |
| 1 | 15 | 1 | 9 | 9 | C COMPANY | 60 | 40000 |
| 1 | 14 | 1 | 9 | 9 | C COMPANY | 60 | 40000 |
| 1 | 13 | 1 | 9 | 9 | C COMPANY | 60 | 40000 |
| 1 | 12 | 1 | 8 | 8 | G COMPANY | 786 | 11000 |
| 1 | 11 | 1 | 8 | 8 | G COMPANY | 786 | 11000 |
| 1 | 10 | 1 | 8 | 8 | G COMPANY | 786 | 11000 |
| 1 | 9 | 1 | 7 | 7 | F COMPANY | 981 | 2000 |
| 1 | 8 | 1 | 6 | 6 | E COMPANY | 56000 | 300 |
| 1 | 7 | 1 | 5 | 5 | A COMPANY | 1270 | 200 |
| 1 | 6 | 1 | 4 | 4 | D COMPANY | 3560 | 125000 |
| 1 | 5 | 1 | 3 | 3 | C COMPANY | 59 | 20000 |
| 1 | 4 | 1 | 3 | 3 | C COMPANY | 59 | 20000 |
| 1 | 3 | 1 | 3 | 3 | C COMPANY | 59 | 20000 |
| 1 | 2 | 1 | 2 | 2 | B COMPANY | 500 | 100000 |
| 1 | 1 | 1 | 1 | 1 | A COMPANY | 1250 | 100 |

SERVER, METHOD, AND PROGRAM FOR PROVIDING FINANCIAL INFORMATION

TECHNICAL FIELD

The present invention relates to a system of providing financial information.

RELATED ART

In recent years, most trading in financial commodity markets is performed electronically via computer networks. Typically, an investor connects an Internet capable terminal to a network to initiate electronic trading. In online trading, an investor determines details of an order and timing of placement of the order based on financial information received at the terminal in real time from a stock exchange terminal or other source node providing the information. Accordingly, an investor's judgment is influenced by the financial information received at the investor's terminal from the stock exchange or the like. Thus, when there is a delay in receiving the financial information, an investor is caused to make judgments based on out-of-date information, potentially resulting in a huge financial loss for the investor. It is clear, therefore, that a financial information providing system must provide information instantaneously (refer to JP2006-031371A).

In addition to instantaneous provision of financial information, reliability of the information is also important. JP2008-147819A discloses a system for distributing stock and financial data, in which loads of distribution imposed on servers and networks are reduced. In the system a receiving/editing server assigns a number upon receipt of data transmitted by an information providing apparatus and then forwards the data to a multicasting server and query server. The multicasting server distributes a message(s) based on group information. The query server transmits lost data in response to a request by a client terminal. JP2007-274332A discloses an apparatus that multicasts packets.

SUMMARY

In the system disclosed in P2008-147819A in which numbers are issued for data by an upper node in a network, an order of messages is determined based solely on the number attached to each respective message by a lower node in the network.

The present invention provides a method and system of providing financial information, a server employed in the system and a program installed in the server, in which system a node in a lower layer can process financial data more flexibly.

In a first aspect of the present invention, there is provided a server including: a receiving unit that receives a message from a node in an upper layer, wherein: the node is included in a layered financial information providing system; the financial information providing system includes a synchronous distribution node and an asynchronous distribution node; the synchronous distribution node and the asynchronous distribution node have entities; each entity distributes a message to which a sequence number is added; messages distributed by the entities of the synchronous distribution node, to which a same sequence number is added, include a same content; and messages distributed by the entities of the asynchronous distribution node, to which a same sequence number is added, does not necessarily contain a same content; a storing unit that stores data, an identifying unit that: determines whether to store a message received by the receiving unit by identifying a sequence number of the message when the message is transmitted by the synchronous distribution node; stores the received message in the storing unit when it is determined that the received message is to be stored; stores the received message in the storing unit when the received message is transmitted by a predetermined entity of the asynchronous distribution node; and sequentially selects and identifies messages from the storing unit subject messages for processing; an editing unit that edits financial information included in the subject message identified by the identifying unit based on financial engineering, wherein the editing performed is the same in all servers in the same layer; an adding unit that adds to a subject message identified by the identifying unit: a group number and a sequence number when the subject message is transmitted by the synchronous distribution node, wherein issued sequence numbers are monotonically increasing in a group; and a monotonically increasing sequence number when the subject message is transmitted by the asynchronous distribution node; and a transmitting unit that transmits a message in which editing by the editing unit and addition by the adding unit are performed on a node in the lower layer.

In a second aspect of the present invention, the adding unit performs processing on a predetermined processing batch basis, each batch executable in parallel; and differing group numbers are assigned to differing predetermined processing batches.

In the third aspect of the present invention, the storing unit stores a latest sequence number of the received message transmitted by the synchronous distribution node for each group number; and when the received message is transmitted by the synchronous distribution node, the received message includes a group number, a sequence number for which is greater than a sequence number for the group number stored in the storing unit, the sorting unit stores the sequence number of the received message in the storing unit and identifies the received message as the subject message In a fourth aspect of the present invention, the adding unit issues a new sequence number, based on sequence numbers added by a node in the upper layer, to be added to the message.

In a fifth aspect of the present invention, the server further includes a requesting unit that, when the received message is transmitted by the predetermined entity and a sequence number of the received message is greater by more than two than a latest sequence number stored in the storing unit, requests an entity to retransmit a message corresponding to a lost sequence number; and a changing unit that changes from the entity into another entity of the asynchronous distribution node when the predetermined entity becomes unavailable.

In a sixth aspect of the present invention, there is provided a method of distributing financial information, including: receiving a message from a node in an upper layer, wherein: the node is included in a layered financial information providing system; the financial information providing system includes a synchronous distribution node and asynchronous distribution node; the synchronous distribution node and the asynchronous distribution node have entities, each entity distributing a message in which a sequence number is added; messages distributed by the entities of the synchronous distribution node, in which a same sequence number is added, include a same content; and messages distributed by the entities of the asynchronous distribution node in which a same sequence number is added does not necessarily contain a same content; determining whether to store a received message according to a sequence number of the message when the message is transmitted by the synchronous distribution node and storing the received message in a storing unit when the received message is determined to be stored; storing a received message in the storing unit when the received message is transmitted by a predetermined entity of the asynchronous distribution node; sequentially selecting messages from the storing unit to identify as subject messages for processing; editing financial information included in the identified subject message based on financial engineering, wherein the editing performed is the same in all servers in the same layer; adding to the identified subject message: a group number and a sequence number when the subject message is transmitted by the synchronous distribution node, wherein issued sequence numbers are monotonically increasing in a group; and a monotonically increasing sequence number when the subject message is transmitted by the asynchronous distribution node; and transmitting a message in which editing by the editing unit and addition by the adding unit are performed on a node in the lower layer.

According to the first and sixth aspects of the present invention, a server in a lower layer has choices of sequence numbers for use, which numbers have been added at any upper layer(s). As a result, the flexibility of processing in the server is improved as compared to a case where only the server can handle only a sequence number added at the immediately upper layer.

According to the second aspect of the present invention, it is possible to handle messages based on group numbers, each of which is issued for a processing batch.

According to the third aspect of the present invention, it is possible to determine an order of the messages transmitted redundantly.

According to the fourth aspect of the present invention, it is possible to select any one of the sequence numbers added at different layers for use of processing.

According to the fifth aspect of the present invention, a reliability of the system improves as compared to a case where the system depends on a particular server(s) or entity (s).

BRIEF DESCRIPTION OF THE DRAWINGS

Exemplary embodiments of the present invention will be described in detail based on the following figures, wherein.

DESCRIPTION

1. Configuration

Figure 1:
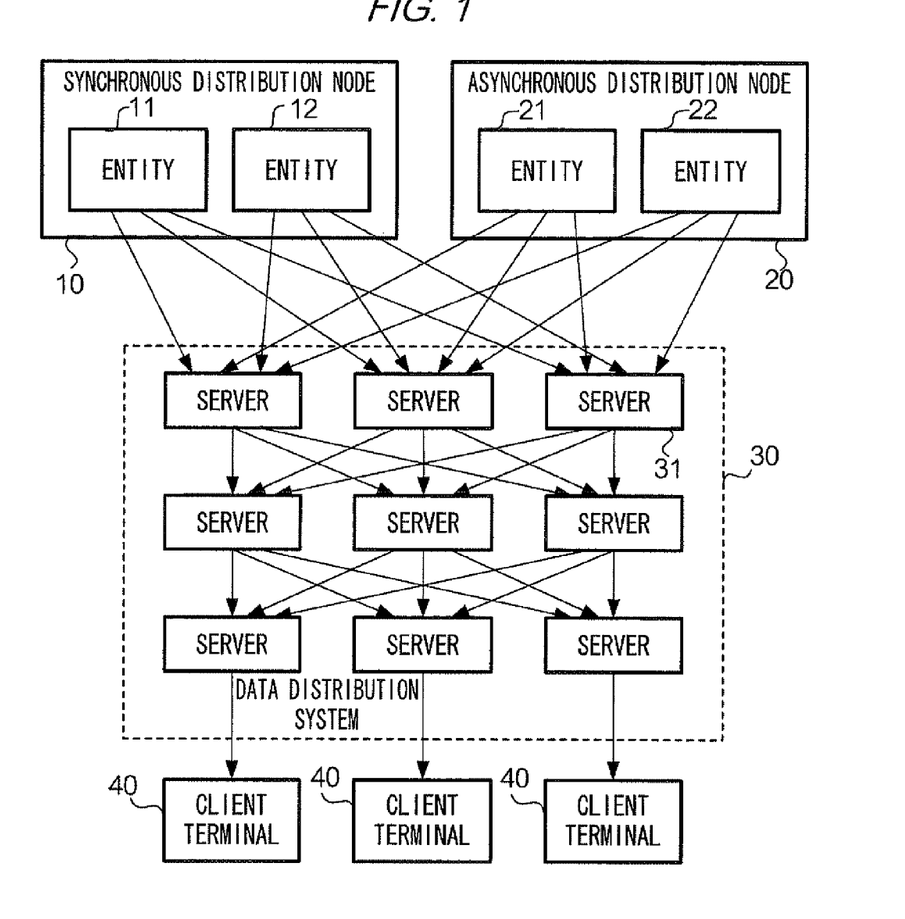
FIG. 1 shows a schematic configuration of a financial information providing system 1.

FIG. 1 shows a configuration of the financial information providing system 1 according to an embodiment of the present invention. The financial information providing system 1 includes a synchronous distribution node 10, asynchronous distribution node 20, data providing system 30, and client terminal 40. The synchronous distribution node 10 and the asynchronous distribution node 20 forward messages (dataset in a predetermined format) containing financial information. The data distribution system 30 edits the message forwarded by the synchronous distribution node 10 or asynchronous distribution node 20, and transmits the thus edited message to client terminals 40.

Figure 5:
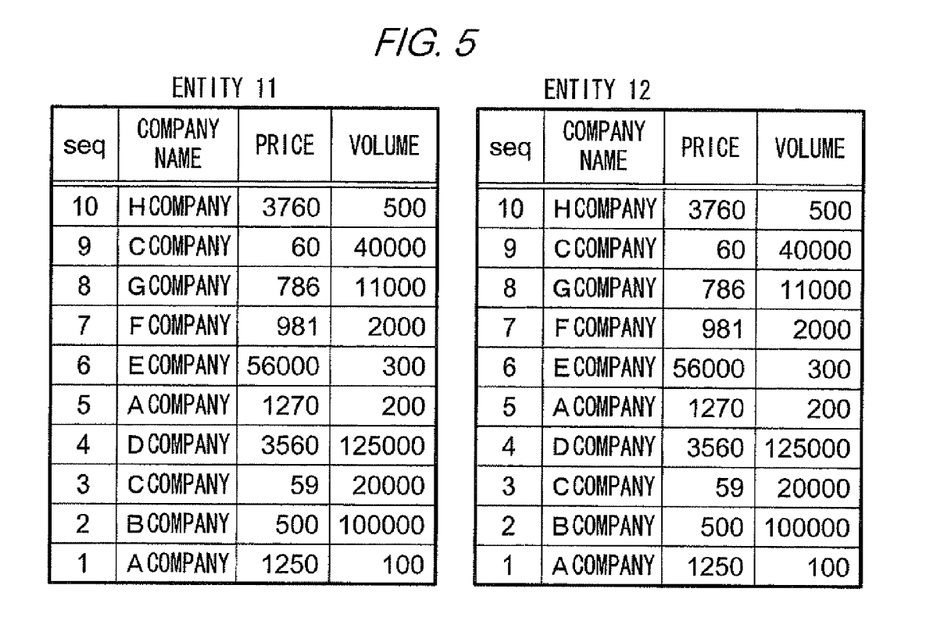
FIG. 5 shows an example of messages transmitted by synchronous distribution node 10.

The synchronous distribution node 10 includes entities 11 and 12. The entities 11 and 12 may be realized by implementing computers in the synchronous distribution node 10 or application software running in the computers. The entities 11 and 12 transmit messages, separately. Each message includes a header and message body. A header of a message includes a sequence number or ID of the message. For example, the sequence numbers are monotonically increasing integers. A sequence number is issued by each of the entities 11 and 12 for each message. The message body includes financial information. As for messages transmitted by entities 11 and 12, messages in which the same sequence number is added include financial information of the same content. For example, a message having sequence number 1 transmitted by the entity 11 and a message having sequence number 1 transmitted by the entity 12 include the same financial information, as shown in FIG. 5. "Synchronous" of the synchronous distribution node 10 is derived from the property described above. User datagram protocol (UDP), which is a connectionless protocol, may be employed for sending messages from the entities 11 or 12 to the data distribution system 30. The reasoning of a provision of same information by multiple entities is to ensure that is data provided to the data providing system 30 when one item of the data is lost during a transmission, although such a provision causes a redundancy. The entities 11 and 12 have a list (hereinafter referred to as group information) of nodes (servers 31) to which messages are to be sent. Accordingly, messages are sent (multicasted) to the nodes included in the list.

The asynchronous distribution node 20 includes entities 21 and 22. The entities 21 and 22 transmit messages. As for messages transmitted by the entities 21 and 22, messages having the same sequence number do not necessarily include the same content of financial information. It should be noted that there is a case where those messages happen to include the same content. For example, a message transmitted by the entity 21 having sequence number 1 and a message transmitted by the entity 22 having sequence number 1 include different contents of financial information. "Asynchronous" of the asynchronous distribution node 10 is derived from the property described above.

The data providing system 30 includes multiple servers 31. The data providing system has a layered architecture. One or more servers 31 belong to a single layer. A server 31 in a layer receives a message from one or more servers 31 in an upper layer and forwards the message to one or more servers 31 in a lower layer. FIG. 1 shows that servers 31 belong to any one of the three layers. Each layer accommodates three servers 31. Hereinafter, a server is referred by a description "a server 31(x, y)" when a particular server 31 needs to be distinguished. A description "server 31(x, y)" indicates a server 31 of the xth server in the yth layer. For example, a server 31(2, 1) indicates the second server in the first layer. In FIG. 1, servers 31, which receive messages directly from the synchronous distribution node 10 and the asynchronous distribution node 20 message are classified as servers in the first (i.e., the most upper) layer, and servers 31, which transmit directly to client terminal 40, are classified as the lowest (third) layer.

The client terminal 40 receives a message from the data providing system 30, and performs processing on the received message. For example, the client terminal 40 displays a chart or other figures representing contents of financial information included in the received message in a display of the client terminal in real time.

Figure 2:
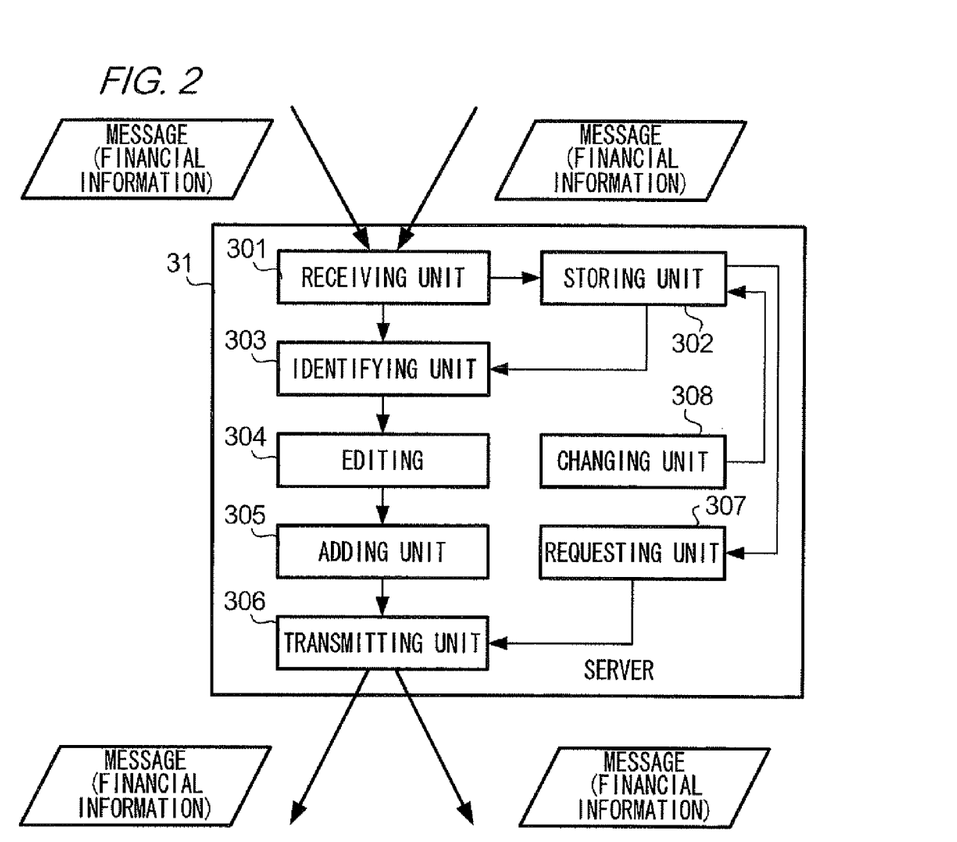
FIG. 2 shows a functional configuration of a server 31.

FIG. 2 shows a functional configuration of the server 31. A receiving unit 301 receives a message from a server 31 of an upper layer. A storing unit 302 is configured to store data. An identifying unit 303 identifies a message to be subjected to processing performed by an editing unit 304. When a message received by the receiving unit 301 is a message transmitted by the synchronous distribution node 10, the identifying unit 303 determines whether to store the message based on a sequence number of the message. Messages are stored in the storing unit 302. On the other hand, when the received message is a message transmitted by a predetermined entity of asynchronous distribution node 20, the identifying unit 301 stores the message in the storing unit 302. The identifying unit 303 sequentially selects messages one by one from the storing unit 302 as a processing object. The editing unit 304 edits (specifically, performs arithmetic computation on) financial information included in the message selected by the identifying unit 303 by financial engineering. It is noted that different servers 31 in the same layer perform the same arithmetic computation. Specifically, when the message selected as a processing object by the identifying unit 303 is a message transmitted by the synchronous distribution node 10, an adding unit 305 adds a group number and a sequence number, which sequence numbers are monotonically increasing in the group to the message. On the other hand, when the message selected as a processing object by the identifying unit 303 is a message transmitted by the asynchronous distribution node 20, the adding unit 305 adds a monotonically increasing sequence number to the message. The transmitting unit 306 transmits the message in which processing by the editing unit 304 and an addition by the adding unit 305 have been performed to a server 31 of a lower layer or a client terminal 40.

When a message received by the receiving unit 301 originates from the predetermined entity and a sequence number of the message is larger than the latest sequence number stored in the storing unit 302 by more than two, a requesting unit 307 requests the predetermined entity to transmit messages specified by the lacking sequence number. A changing unit 308 changes the predetermined entity to another entity to obtain messages, when there is a malfunction in the predetermined entity or the predetermined entity becomes unavailable for some reason.

Figure 3:
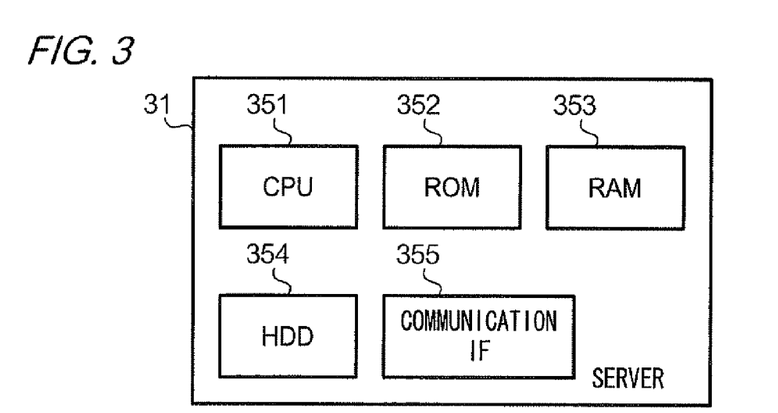
FIG. 3 shows a hardware configuration of the server 31.

FIG. 3 shows a hardware configuration of the server 31. The server 31 includes a CPU 351, ROM 352, RAM 353, Hard drive (HDD) 354, and communication IF (Interface) 355. The CPU 351 is a processor configured to execute programs stored in the ROM 352 and HDD 354 using the RAM 353 as a work area. The ROM 352 is a non-volatile storage device that stores programs and data. The RAM 353 is a non-volatile storage device configured to store programs and data. HDD 354 is an external non-volatile storage device that stores programs and data. The communication IF 355 is an interface that performs communications via a network. Functions shown in FIG. 2 are realized in the server 31 by executing programs stored in the HDD 354 by the CPU 351. In other words, the CPU 351 executing programs functions as the identifying unit 303, the editing unit 304, the adding unit 305, the requesting unit 307, and the changing unit 308. The communication IF 355 functions as the receiving unit 301 and the transmitting unit 306 under control of the CPU 351. The RAM 353 accessible by the CPU 351 functions as the storing unit 302.

2. Operation

Figure 4:
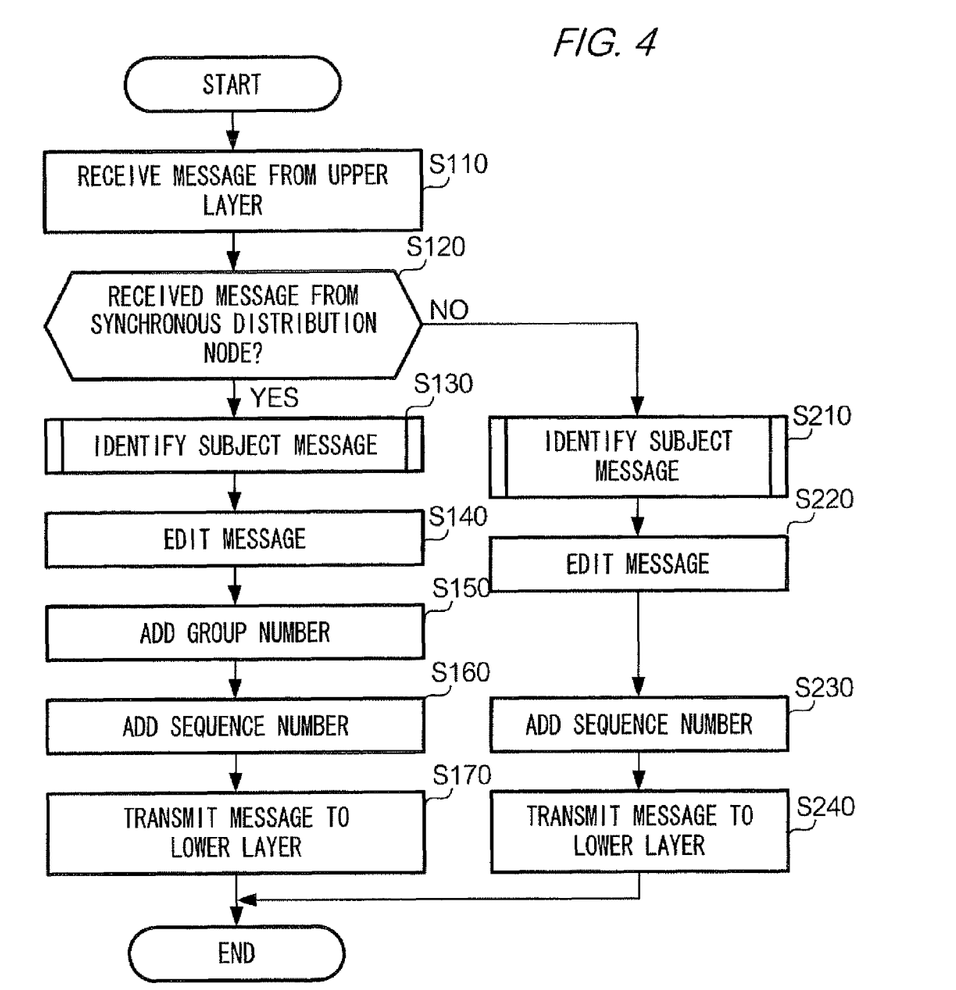
FIG. 4 is a flowchart showing an operation of the financial information providing system 1.

FIG. 4 is a flowchart showing an operation of the financial information providing system 1, in which operation of the servers 31 is focused on. An operation of the financial information providing system 1 will now be described in a situation assumed as described below. Supposing that the synchronous distribution node 10 and the asynchronous distribution nodes 20 are provided at an ABC stock exchange and DEF stock exchange, respectively. Messages distributed by the synchronous distribution node 10 and the asynchronous distribution node 20 include financial information on contracts executed in the ABC stock exchange and DEF stock exchange, receptively. In the data providing system 30, a server 31 edits financial information included in a message received from a node of an upper layer and transmits the edited message to a node of a lower layer. Hereinafter, an entire operation of the data providing system 30 will be explained by means of a server 31.

FIG. 5 shows an example of messages distributed by the synchronous distribution node 10 (entity 11 or 12). In this example a header of each message includes a sequence number. A company name, price, and trading volume are included in a message body as the financial information. For example, financial information specified by sequence number 1 represents that there is an agreement with a trade of 100 bonds of company A at 1,250 yen. It should be noted that a message having a smaller sequence number is distributed earlier.

Figure 6:
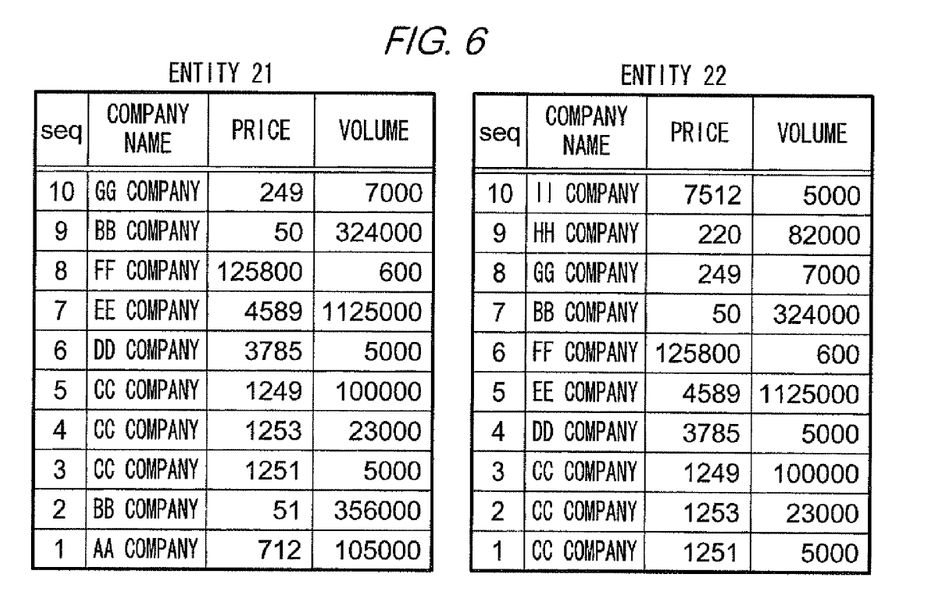
FIG. 6 shows an example of messages transmitted by asynchronous distribution node 20.

FIG. 6 shows an example of messages distributed by the asynchronous distribution node 20 (entity 21 or 22). Configurations of the messages are the same as the messages distributed by the synchronous distribution node 10.

2-1 Operation of Servers 31 of the First Layer

Referring back to FIG. 4, explanation is focused on a server 31 of the first layer. In step S110, the receiving unit 301 receives a message from the entity 11, 12, 21, or 22. The receiving unit 301 adds a timestamp representative of a time of reception to each received message.

In step S120, the identifying unit 303 determines whether the received message is a message transmitted by the synchronous distribution node 10. In this example, a header of a message includes a flag representing that the message has been transmitted either by the synchronous distribution node 10 or the asynchronous distribution node 20. The identifying unit 303 determines whether the received message has been transmitted by the synchronous distribution node 10 based on a flag included in a header of the received message. Alternatively, the header of a message may include an identifier identifying a sender of the message (i.e., either the synchronous distribution node 10 or the asynchronous distribution node 20). In this case, the identifying unit 303 determines whether a received message has been transmitted by the synchronous distribution node 10. If it is determined that the received message has been transmitted by the synchronous distribution node 10 (step S120, YES), the identifying unit 303 proceeds to step S130. If it is determined that the received message has not been transmitted by the synchronous distribution node 10, i.e., it has been transmitted by the asynchronous distribution node 20 (step S120, NO), the identifying unit 303 proceeds to step S210.

2-1-1. Handling of Messages from the Synchronous Distribution Node

Figure 7:
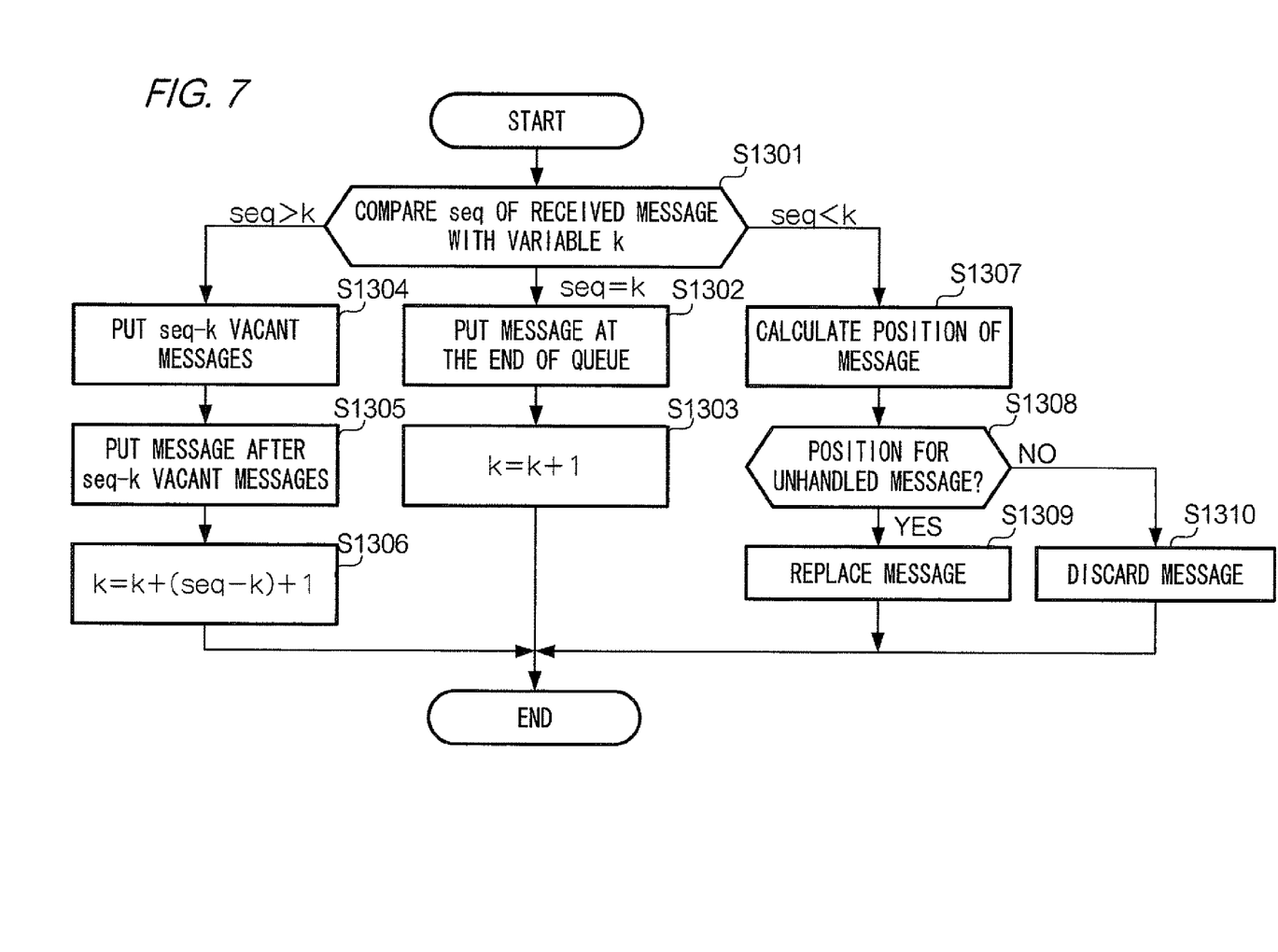
FIG. 7 shows a flowchart showing a processing on a message performed in step S130 in detail.

FIG. 7 is a flowchart showing detailed processing of step S130. In step S130, the identifying unit 303 identifies a message subjected to processing and supplies the message to subsequent processing. Specifically, the subsequent processing includes inputting a message into a queue (enqueuing), and outputting a message from a queue (dequeuing). Details of the enqueuing will now be described. The identifying unit 303 receives messages from multiple entities and outputs the received messages to the servers of the lower layer in an order according to the sequence numbers given for each group. A queue for storing messages is provided for each group and stored in the storing unit 302A. In this example the queue is a ring buffer of a size N. Each element of the ring buffer is identified by an index. Pointer variables h and t, which represent a position at which data is written and a position at which data is read, respectively, are employed. In other words, the variables h and t represent a top and end of a queue, respectively. In addition, there is a variable k representative of a sequence number of a message to be enqueued next. It is noted that the variable k is initialized prior to step S130. In step S1301, the identifying unit 303 compares a sequence number seq of a received message with the variable k. If seq=k, the identifying unit 303 proceeds to step S1302. If seq>k, the identifying unit 303 proceeds to step S1304. If seq<k, the identifying unit 303 proceeds to step S1307.

In step S1302, the identifying unit 303 puts the received message to the end of the queue. In step S1303, the identifying unit 303 updates the variable k by adding one to the variable k (i.e., k=k+1). The variable t is shifted by one.

In step S1304, the identifying unit 303 puts seq−k vacant messages in the queue. Each vacant message includes a flag representative of a lost message in a position, a sequence number of the lost message to be put in the position, a tentative time of reception of the lost message, and a time stamp representative of a tentative time of reception of the original message. In step S1305, the identifying unit 303 puts the received message in a position immediately subsequent to the vacant messages. For example, when k=3 and seq=5, 2 (i.e., 5−3), vacant messages are put in the queue and a message of sequence number 5 is put immediately subsequent to the vacant messages. As a result, two vacant messages are inserted between the message having sequence number 2 and the message having sequence number 5. In step S1306, the identifying unit 303 updates the variable k by an operation k=k+(seq−k)+1. In other words, the identifying unit 303 increases a value of the variable k by a number equivalent to the number of added messages (including added vacant messages). The variable t is shifted by seq−k+1.

In step S1307, the identifying unit 303 determines a position i at which a next message is put in the queue. Specifically, position i is calculated as i=C−(k−seq). C represents a size of the queue, which is equal to the number of messages being enqueued. In step S1308, the identifying unit 303 determines whether a position at which a next message should be put is a position for an unprocessed message, i.e., i≧h. If i≧h (S1308, YES), the identifying unit 303 proceeds with step S1309. If i<H (S1308, NO), the identifying unit 303 proceeds with step S1310.

In step S1309, the identifying unit 303 replaces the received message with a message in, position i calculated in step S1307, with the variable t unchanged. In step S1310, the identifying unit 303 discards the received message. After completion of step S1303, S1306, S1309, or S1310, the operation of the identifying unit 303 shown in FIG. 7 ends. It is noted that the identifying unit 303 initiates processing of steps S1301-1310 upon receipt of a message.

Figure 8:
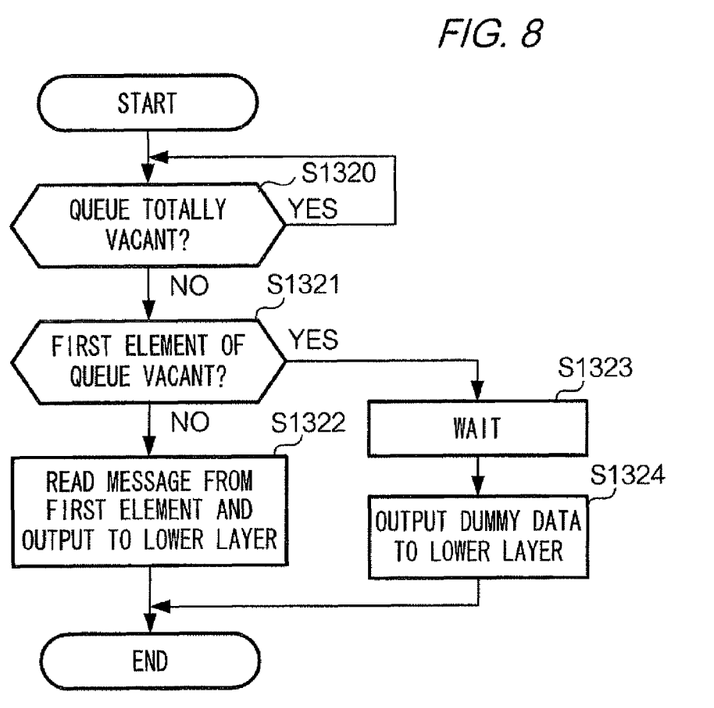
FIG. 8 also shows a flowchart showing a processing on a message performed in step S130 in detail.

FIG. 8 is a flowchart showing an output of messages. In step S1320, the identifying unit 303 checks whether the queue is vacant. Specifically, the variables h and t are used for the determination. If h=t, the whole queue is vacant. Otherwise, the whole queue is not vacant. When the whole queue is vacant (S1320, YES), the identifying unit 303 waits for an event. When the whole queue is not vacant (S1320, NO), the identifying unit 303 determines whether first element of the queue is vacant (step S1321). When the first element is not vacant (S1321, NO), the identifying unit 303 proceeds with step S1322. When the first element contains a vacant message (S1321, YES), the identifying unit 303 proceeds with step S1323.

In step S1322, the identifying unit 303 reads a message put in the first element and outputs the read message to a node of a lower layer. At this time the variable h is updated. In step S1323, the identifying unit 303 waits for a predetermined time period. Specifically, the identifying unit 303 compares a receiving time of the vacant message in the first element and a present time, and waits until the time difference reaches a threshold value. When the first element of the queue becomes non-vacant after arrival of a message during waiting, the identifying unit 303 reads a message in the first element and outputs the read message to a node of the lower layer, similarly to step S1322. If the first element remains vacant after waiting for a predetermined time period, the identifying unit 303 stores a sequence number of the vacant message, which has been calculated in step S1304, as a lost message number in the storing unit 302. Next, the identifying unit 303 generates a dummy message and outputs the dummy message to a node of the lower layer (step S1324).

The identifying unit 303 initiates processing shown in FIG. 8 at a predetermined time period. It is noted that the operations of FIGS. 7 and 8 run in parallel (i.e., are simultaneously executed).

Referring again to FIG. 4, in step S140 the editing unit 304 edits financial information included in a subject message based on financial engineering. It is noted that any server 31 of the same layer performs the same editing. Any algorithm for the editing can be adopted by the editing unit 304. In this example, the editing unit 304 handles multiple pieces of financial information in parallel. In one example, the editing unit 304 handles messages distributed by the synchronous distribution node 10 as a batch of information and messages distributed by the asynchronous distribution node 20 as another batch of information. Processing on the batches of information run independently of each other. Alternatively, the editing unit 304 handles a part of data items (such as company name) included in financial information as a batch of information executable in parallel. In this case, the editing unit 304 may handle contact information, i.e., contract details (information on an agreement such as a contract price) about A company, B company, C company, D company, and so on, are subjected to parallel processing. In this case, two or more messages distributed by the synchronous distribution node 10 and/or the asynchronous distribution node 20 are used for the editing by the editing unit 304. An example of the editing is a subtraction of a price of A company included in a message distributed by the synchronous distribution node 10 from a price of A company included in a message distributed by the asynchronous distribution node 20. Another example of the editing is increasing or decreasing the number of messages. For example, it is a creation of n+1 or n−1 messages based on n messages received from a node in an upper layer.

In step S150, adding unit 305 adds a group number to a message after being processed. In this example, a group number uniquely corresponds to a synchronous distribution node. Specifically, group number 1 is added to messages originating from the synchronous distribution node 10. If an additional synchronous distribution node other than the synchronous distribution node 10 (not shown in FIG. 1) is provided in the financial information providing system 1, group number 2 may be added to messages originating from the additional synchronous distribution node. If yet another additional synchronous distribution node is provided, a group number 3 is added to messages from the yet another additional node. Each message distributed by the synchronous distribution node 10 includes an identifier of the synchronous distribution node 10. The adding unit 305 determines a number to be added based on the identifier.

In another example of the addition of the group number, the adding unit 305 adds a same group number to messages handled by the editing unit 304 as a single batch of information. For example, when the editing unit 304 handles company names included in messages collectively, the adding unit 305 assigns group numbers based on company names. Specifically, the adding unit 305 adds group number 1 to contact information of A company and group number 2 for contact information of B company and 3 for C company, and so on. In yet another example of the addition of the group number, the adding unit 305 assigns a group number based on a combination of what a distributer of a message is and which batch the message belongs to. Specifically, the adding unit 305 may assign group number "1" to contract information of A company distributed by the synchronous distribution node 10, "2" to contract information of A company distributed by the asynchronous distribution node 20, "3" to contract information of B company distributed by the synchronous distribution node 10, and "4" to contract information of B company distributed by the asynchronous distribution node 20.

Figure 9:
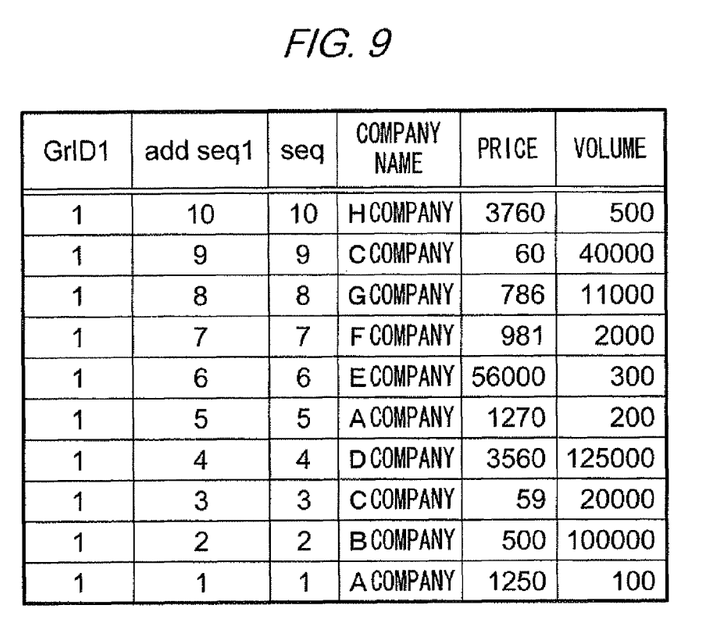
FIG. 9 shows an example of messages in which sequence numbers are added.

Sequence numbers are issued in step S160 so that they monotonically increase for messages having a same group number. FIG. 9 shows an example of messages to which sequence numbers have been added in step S160. In this example, each message includes a group number (GrID1) and sequence number (add seq1), which are added by a server 31 of the first layer, and a sequence number (seq) added by a distributer of the message, i.e., the synchronous distribution node 10. For the convenience of explanation, each message body includes a company name, price and trading volume included in each message body shown in FIG. 9 is the same as the data before processing, but they actually are processed based on financial information as described above.

Referring again to FIG. 4, in step S170 the transmitting unit 306 outputs messages to a node of a lower layer. Specifically, the messages are output in an order according to the sequence numbers added by the adding unit 305. The transmitting unit 306 identifies a destination(s) of the messages based on a list of addresses of servers 31 in the lower layer, which is stored in the storing unit 302.

2-1-2. Processing on Messages Originated from Asynchronous Distribution

Figure 10:
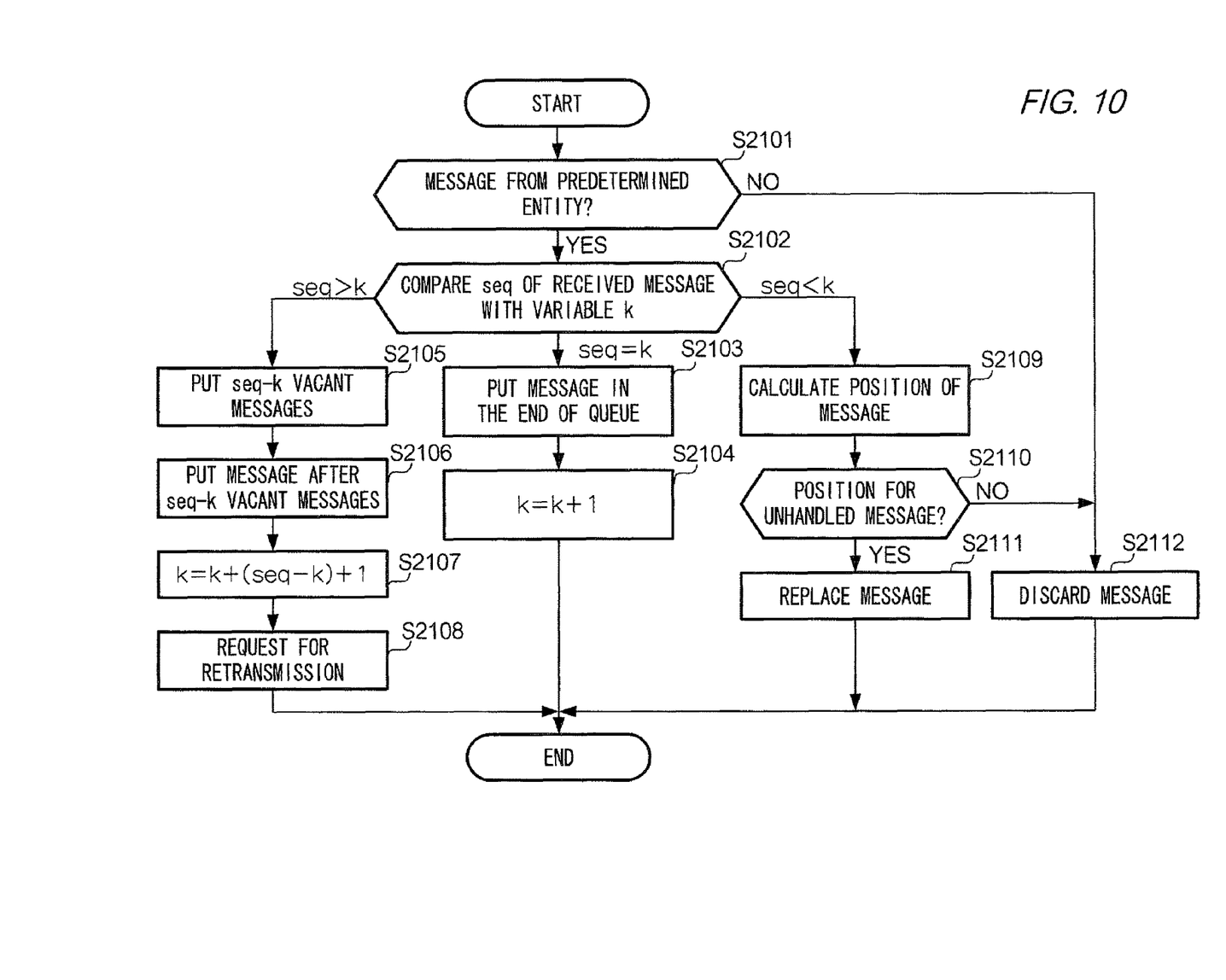
FIG. 10 is a flowchart showing details of processing on a message performed in step S210.

FIG. 10 is a flowchart showing details of processing of step S210. The identifying unit 303 selects an entity accommodated in the asynchronous distribution node 20 as an active entity. Messages originating from the active entity are used in the subsequent processing and messages originating from the other entity are discarded. Detailed processing will now be described with reference to FIG. 10. Similarly to the processing shown in FIGS. 7 and 8, this processing includes enqueuing and dequeuing threads. A queue configured to store messages is provided in storing unit 302. It is noted that this queue is different from the queue configured to store messages originating from the synchronous distribution node 10. This queue is a ring buffer, and the processing is similar to that shown in FIGS. 7 and 8.

In step S2101, the identifying unit 303 determines whether a received message is distributed by the active entity. Each message contains an identifier of an entity by which the message is transmitted. Identifiers of entities are stored in advance in the storing unit 302. The identifying unit 303 compares an identifier contained in a received message and identifiers stored in the storing unit 302 and determines that the received message has been transmitted by the active entity when the identifiers matches. When the received message originates from the active entity (S2101, YES), the identifying unit 303 proceeds with step S2102. When the received message does not originate from the active entity (S2101, NO), the identifying unit 303 proceeds with step S2112.

In step S2102, the identifying unit 303 compares a sequence number seq of the received message with the variable k. If seq=k, the identifying unit 303 proceeds with step S2103. If seq>k, the identifying unit 303 proceeds with step S2105. If seq<k, the identifying unit 303 proceeds with step S2109.

In step S2103, the identifying unit 303 puts the received message at the back of the queue. In step S2104, the identifying unit 303 adds one to the variable k (k=k+1), to update the variable k. The variable t is shifted by one.

In step S2105, the identifying unit 303 puts seq−k vacant messages into the queue. Each vacant message includes a flag representative of a lost message in a position, a sequence number of the lost message to be put in the position, a tentative time of reception of the lost message, and a time stamp representative of a tentative time of reception of the original message. In step S2106, the identifying unit 303 puts the received message in a position immediately subsequent to the vacant messages. In step S2107, the identifying unit 303 updates the variable k by an operation k=k+(seq−k)+1. In other words, the identifying unit 303 increases a value of the variable k by a number equivalent to the number of added messages (including added vacant messages). The variable t is shifted by ((seq−k)+1). In step S2108, the requesting unit 307 requests for the active entity to resend a lost message(s).

In step S2109, the identifying unit 303 determines a position i at which a next message is put in the queue by a calculation i=C−(k−seq), wherein C represents a size of the queue, which is equal to the number of messages being enqueued. In step S2110, the identifying unit 303 determines whether a position at which a next message is put is a position for an unprocessed message, i.e., i≧h. If i≧h (S2110, YES), the identifying unit 303 proceeds with step S2111. If i<h (S2110, NO), the identifying unit 303 proceeds with step S2112.

In step S2111, the identifying unit 303 puts the received message to the position i calculated in step S2109 with the variable t unchanged. In step S2112, the identifying unit 303 discards the received message. After completion of step S2104, S2111, or S2112, the operation of the identifying unit 303 shown in FIG. 10 ends. It is noted that the identifying unit 303 initiates processing of steps S2101-2112 upon receipt of a message. When the receiving unit receives a retransmitted message in response to the request made in step S2108, the operation of FIG. 10 starts again and processing in step S2109 and subsequent steps is performed. Output of a message to a node in a lower layer is similar to that shown in FIG. 8.

Referring again to FIG. 4, in step S220 the editing unit 304 edits the message. In step S230, the adding unit 305 adds a sequence number to the message. In step S240, the transmitting unit 306 transmits the message to a server 31(s) of the second layer. Processing in steps S220, S230, and S240 is similar to that of step S140, S160, and S170, respectively.

Figure 11:
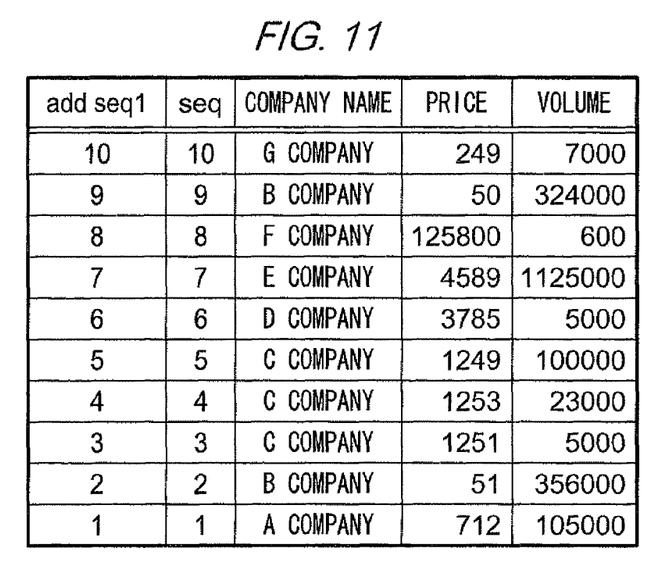
FIG. 11 shows another example of messages in which sequence numbers are added.

FIG. 11 shows an example of messages after the addition of sequence numbers in step S230. As shown in the figure, each message includes a sequence number (add seq1) added by a server 31 of the first layer and sequence number (seq) added by the synchronous distribution node 10 by which the message is transmitted. Contrary to the exemplified messages shown in FIG. 9, each message does not include a group number in the header. Other data items included in a message are the same as those shown in FIG. 9

It is noted that steps of S130 and S140 are performed in parallel. In other words, processing in step S130 is performed on a message while processing is performed on another message in step S140. Similarly, any step shown in FIG. 4 may be used to handle a different message(s).

2-2. Operation of a Server 31 of the Second Layer

An operation performed by a server 31 of the second layer is basically the same as of a server 31 of the first layer. The editing units 304 of the server 31(1,2), server 31(2,2), and server 31(3,2), which are in the second layer, perform the same editing. Specifically, each server 31 of the second layer receives the same message from the servers 31 of the first layer (server 31(1,1), server 31(2,1), and server 31(3,1)). Each message includes a sequence number added by a sender of the message, i.e., the synchronous distribution node 10 or asynchronous distribution node 20, and a sequence number and group number (optional) which are added by a server 31 of the first layer. Hereinafter, a sequence number added by a node of the yth layer is referred to as sequence number (y). Y=0 refers to an original sender of a message, i.e., synchronous distribution node 10 or asynchronous distribution node 20. A similar notion will be used for group numbers.

The identifying unit 303 of a server 31 of the second layer identifies a message subjected to processing using sequence number (1). When a message includes group number (1), it is possible to perform the identification on a group basis. In this case, a queue is provided in the storing unit 302 for each group. Alternatively, the identification may be performed based on sequence number (0).

Figure 12:
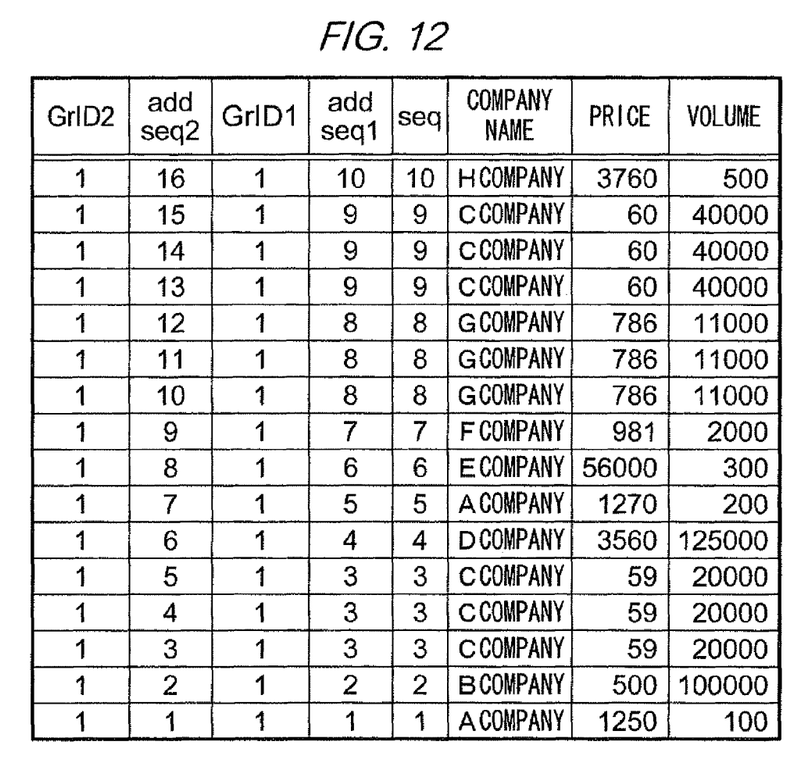
FIG. 12 shows yet another example of messages in which sequence numbers are added.

The editing unit 304 of a server 31 of the second layer performs processing to increase the number of the messages. FIG. 12 shows an example of messages to which sequence numbers have been added in step S150. An original sender of the messages is the synchronous distribution node 10. The messages include a group number (GRID2) and sequence number (add seq2) which are added by a server 31 of the second layer, a group number (GRID1) and sequence number (add seq1) which are added by a server 31 in the first layer, and sequence number (seq) added by the original sender (the synchronous distribution node 10). As for financial information on C company and G Company, the editing unit 304 generates two additional messages based on a single message by duplicating the contract information. As a result, there are three messages having the same contract information in the queue for C company and G company. Sequence numbers (add seq2) are added to all messages in the queue by a server 31 of the second layer. For the sake of convenience, a content (company name, price and trading volume) of a message body shown in FIG. 12 is the same as the original data. However, the message body has been edited based on financial engineering, as described in the foregoing.

Figure 13:
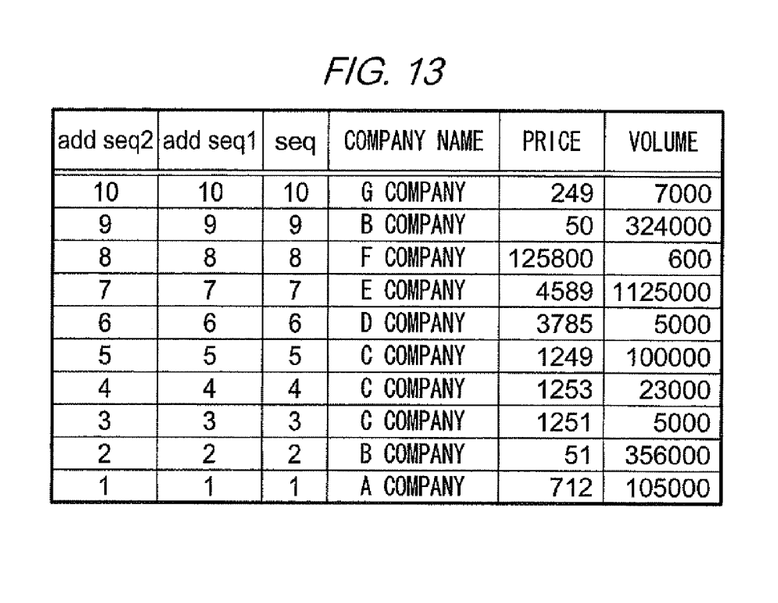
FIG. 13 shows yet another example of messages in which sequence numbers are added.

FIG. 13 shows an example of messages to which sequence numbers have been added by a server 31 of the second layer in step S230. An original sender of the messages is the asynchronous distribution node 20. Each message includes a sequence number (add seq2) added by a server 31 of the second layer, sequence number (add seq1) added by a server 31 of the first layer, and sequence number (seq) added by the original sender (i.e., the synchronous distribution node 10). The messages shown in FIG. 13 are different from the messages shown in FIG. 9 in that headers do not include group numbers. The other data elements of the messages shown in FIG. 13 are the same as those of FIG. 12. A server 31 of the second layer transmits messages shown in FIG. 12 or FIG. 13 to a server(s) 31 of the third layer.

2-3. Operation of a Node in the Third or Lower Layers

An operation of a server 31 of the third or lower layers is the same as that of a server 31 of the second layer. For example, the identifying unit 303 of a server 31 of the third layer selects messages subjected to processing using sequence number (0), sequence number (1), or sequence number (2). In other words, it is possible for the identifying unit 303 to determine an order of a message in a queue using at least any one of sequence number (0), sequence number (1) and sequence number (2). Any rule as to which sequence number added by an upper node is used in a server 31 of the third layer can be adopted. For example, the rule may define a use of a sequence number (j) added in the jth layer. The identifying unit 303 may change a sequence number. For example, when a failure or malfunction in the jth layer is notified, the identifying unit 303 changes from sequence number (j) to sequence number (j−1) added by an upper layer. In this case, the storing unit 302 may store a parameter indicative of a layer in which a sequence number is added. It is possible to apply the selection of a sequence number described above to a server 31 of the second, fourth or lower layers.

A server 31 of the lowest layer transmits messages to the client terminal 40. Specifically the storing unit 302 of the server 31 of the last layer stores a list of addresses as destinations of messages. The transmitting unit 306 determines the destination referring to the storing unit 302.

3. Modifications

Exemplified embodiments described above can be modified as provided below. Needless to say, modified examples describe below can be implemented alone or in combination.

The financial information providing system 1 may include two or more synchronous distribution nodes or asynchronous distribution nodes. Each data distribution node may include three or more entities. A data providing system 30 may have architecture of two, four or more layers. Differing layers may have differing numbers of nodes (servers 31). It is possible to employ protocols other than UDP. A configuration of the server 31 is not limited to the one shown in FIG. 2. Implementation of the requesting unit 307 and the changing unit 308 may be omitted.

Although no group number is added to a message distributed by the asynchronous distribution node 20 in the above embodiment, the adding unit 305 may add a group number distributed by the asynchronous distribution node 20 based on financial information (ex. company name) included in a message.

Details of a selection of messages subjected to processing based on a sequence number is not limited to an operation shown in FIGS. 7, 8, and 10. Simply stated, any algorithm of determining an order (timing of execution) of processing according to a sequence number can be adopted. A Queue may be implement as a hardware item other than a ring buffer.

Financial information and editing of the financial information described above is merely an example and therefore any computation on the data included in a message can be construed as editing of financial information described above.

Programs executed by the CPU 351 can be provided via a storing unit executable by a computer. The storing unit may include a magnetic storing medium (magnetic tape magnetic disk such as a HDD and flexible disk (FD)), optical storing medium (optical disk such as a compact disk (CD) and digital versatile disk (DVD)), magneto-optical sorting medium, and semiconductor storing medium such as a flash memory. Alternatively, the program may be downloaded.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A server comprising:
   a receiving unit that receives a message from a node in an upper layer,
      wherein the node is included in a layered financial information providing system,
      the financial information providing system includes a synchronous distribution node and asynchronous distribution node, the synchronous distribution node and the asynchronous distribution node have entities,
      each entity distributes a message to which a first sequence number is added, messages distributed by the entities of the synchronous distribution node to which a same first sequence number is added, include a same content, and
      messages distributed by the entities of the asynchronous distribution node to which the same first sequence number is added does not necessarily contain the same content;
   a storing unit that stores data;
   an identifying unit that:
      determines whether to store a message received by the receiving unit according to the first sequence number of the message when the message is transmitted by the synchronous distribution node;
      stores the received message in the storing unit when the received message is determined to be stored;
      stores the received message in the storing unit when the received message is transmitted by a predetermined entity of the asynchronous distribution node; and
      sequentially selects messages from the storing unit to be identified as subject messages for processing;
   an editing unit that edits financial information included in the subject message identified by the identifying unit based on financial engineering, wherein the editing is the same as editing performed by a second server in a same layer;
   an adding unit that adds to the subject message identified by the identifying unit a group number and a second sequence number when the subject message is transmitted by the synchronous distribution node, the second sequence number monotonically increasing in one group, and that adds to the subject message a third sequence number when the subject message is transmitted by the asynchronous distribution node, the third sequence number monotonically increasing; and
   a transmitting unit that transmits to a second node in a lower layer the message for which editing by the editing unit and addition by the adding unit are performed.

2. The server according to claim 1, wherein:
   the adding unit performs processing on a predetermined processing batch basis, each batch executable in parallel; and
   differing group numbers are assigned to differing predetermined processing batches.

3. The server according to claim 1, wherein:
   the storing unit stores a latest first sequence number of the received message transmitted by the synchronous distribution node for each group number; and
   when the received message is transmitted by synchronous distribution node, the received message includes the group number, and the first sequence number for the group number of the received message is greater than the first sequence number for the group number stored in the storing unit, the identifying unit being configured to store the first sequence number of the received message in the storing unit and identify the received message as the subject message.

4. The server according to claim 1, wherein the adding unit adds to the subject message a new second sequence number or a new third sequence number based on the first sequence number added by a node in the upper layer.

5. The server according to claim 1, further comprising:
   a requesting unit that, when the received message is transmitted by the predetermined entity and the first sequence number of the received message is greater than a latest first sequence number stored in the storing unit by more than two, requests an entity to resend a message corresponding to a lost first sequence number; and
   a changing unit that changes from the entity into another entity of the asynchronous distribution node when the predetermined entity becomes unavailable.

6. A method of distributing financial information, comprising:
   receiving a message from a node in an upper layer,
      wherein the node is included in a layered financial information providing system, the financial information providing system includes a synchronous distribution node and an asynchronous distribution node,
      the synchronous distribution node and the asynchronous distribution node have entities,
      each entity distributes a message to which a first sequence number is added, messages distributed by the entities of the synchronous distribution node, to which a same first sequence number is added include a same content, and
      messages distributed by the entities of the asynchronous distribution node to which the same first sequence number is added does not necessarily contain the same content;
   determining whether to store a received message according to the first sequence number of the message when the message is transmitted by the synchronous distribution node, and storing the received message in a storing unit when the received message is determined to be stored;
   storing a received message in the storing unit when the received message is transmitted by a predetermined entity of the asynchronous distribution node;
   sequentially selecting messages from the storing unit to identify as subject messages for processing;

editing financial information included in the identified subject message based on financial engineering, wherein the editing is the same as editing performed by a server in a same layer;

adding to the identified subject message a group number and a second sequence number when the subject message is transmitted by the synchronous distribution node, the second sequence numbers monotonically increasing in one group:

adding to the subject message, a third sequence number when the subject message is transmitted by the asynchronous distribution node, the third sequence number monotonically increasing; and transmitting to a node in a lower layer the subject message in which the editing and the adding are performed.

7. A non-transitory computer readable storing medium storing a program that causes a computer to execute a process, the process comprising:

receiving a message from a node in an upper layer,
  wherein the node is included in a layered financial information providing system,
  the financial information providing system includes a synchronous distribution node and an asynchronous distribution node,
  the synchronous distribution node and the asynchronous distribution node have entities, each entity distributes a message to which a first sequence number is added, messages distributed by the entities of the synchronous distribution node, to which a same first sequence number is added include a same content, and messages distributed by the entities of the asynchronous distribution node to which the same first sequence number is added does not necessarily contain the same content;

determining whether to store a received message according to the first sequence number of the message when the message is transmitted by the synchronous distribution node, and storing the received message in a storing unit when the received message is determined to be stored;

storing a received message in the storing unit when the received message is transmitted by a predetermined entity of the asynchronous distribution node;

sequentially selecting messages from the storing unit to identify as subject messages for processing;

editing financial information included in the identified subject message based on financial engineering, wherein the editing is the same as editing performed by a server in a same layer;

adding to the identified subject message: a group number and a second sequence number when the subject message is transmitted by the synchronous distribution node, the second sequence numbers monotonically increasing in one group;

adding to the subject message a third sequence number when the subject message is transmitted by the asynchronous distribution node, the third sequence number monotonically increasing; and transmitting to a node in a lower layer the subject message for which the editing and adding are performed.

* * * * *